Figure 1:
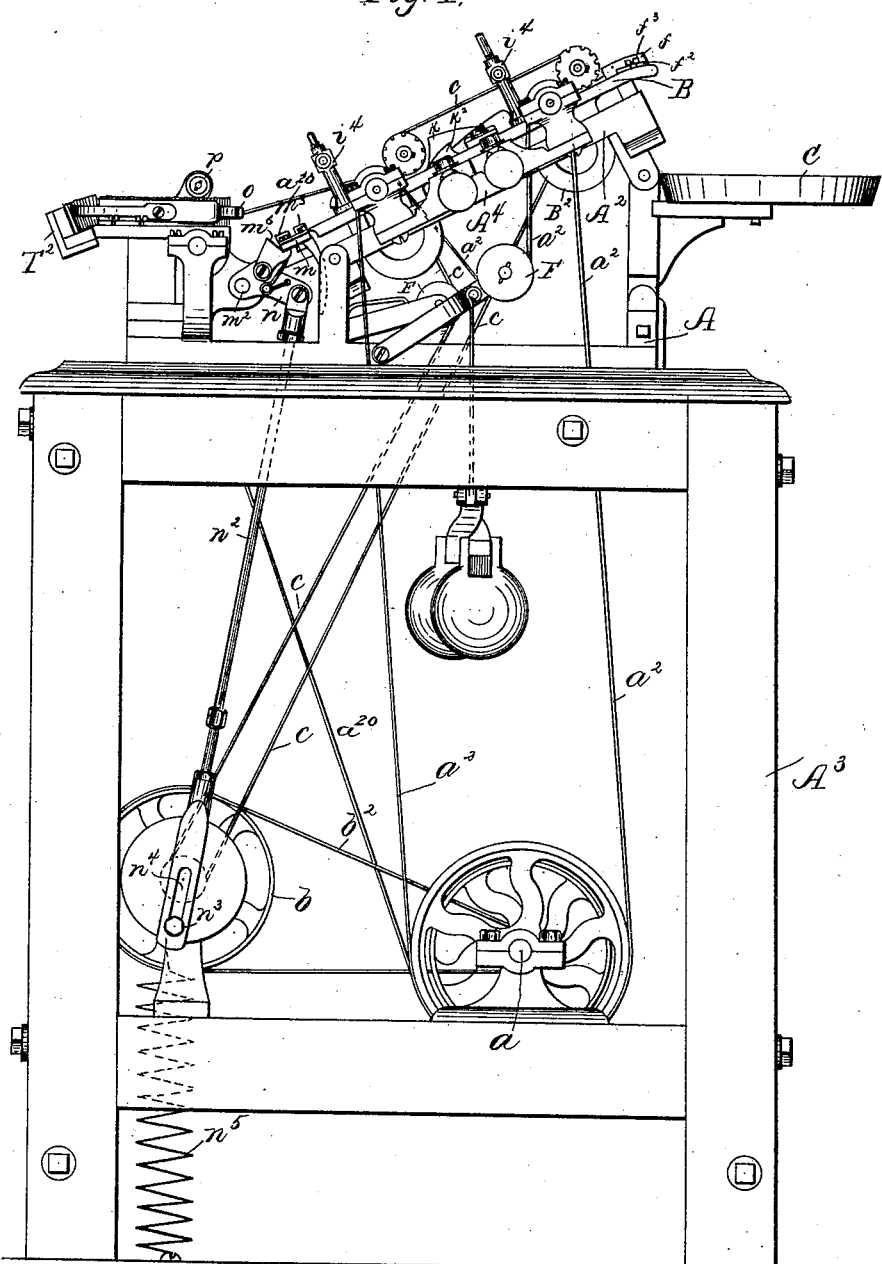

(No Model.)   5 Sheets—Sheet 1.

T. M. KENNEY.
TYPE FINISHING MACHINE.

No. 484,915. Patented Oct. 25, 1892.

Witnesses
Jas. J. Maloney.
M. E. Hill.

Inventor
Thomas M. Kenney
by Jno. P. Livermore
Att'y.

(No Model.)

T. M. KENNEY.
TYPE FINISHING MACHINE.

No. 484,915. Patented Oct. 25, 1892.

Witnesses
Jas. J. Maloney.
M. E. Hill.

Inventor.
Thomas M. Kenney.
by Jos. P. Livermore
Att'y.

(No Model.) 5 Sheets—Sheet 3.

T. M. KENNEY.
TYPE FINISHING MACHINE.

No. 484,915. Patented Oct. 25, 1892.

Witnesses
Jas. J. Maloney.
M. E. Hill.

Inventor.
Thomas M. Kenney
by Jno. P. Livermore
Atty.

(No Model.) 5 Sheets—Sheet 4.

T. M. KENNEY.
TYPE FINISHING MACHINE.

No. 484,915. Patented Oct. 25, 1892.

Witnesses
Jas. J. Maloney.
M. E. Hice.

Inventor,
Thomas M. Kenney.
by Jos. P. Livermore
Att'y.

(No Model.)  5 Sheets—Sheet 5.
T. M. KENNEY.
TYPE FINISHING MACHINE.
No. 484,915.  Patented Oct. 25, 1892.
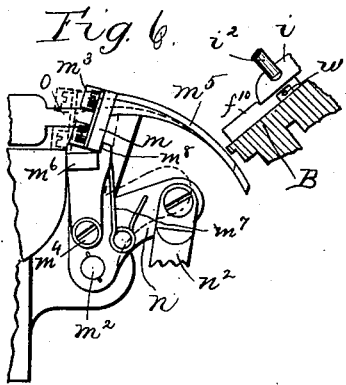
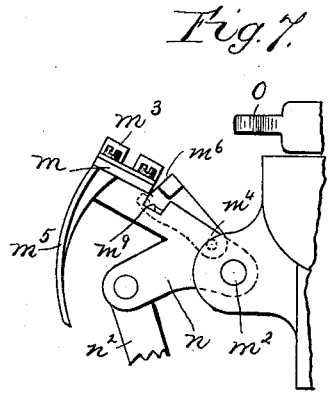
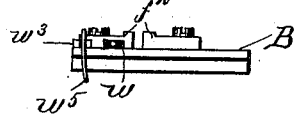
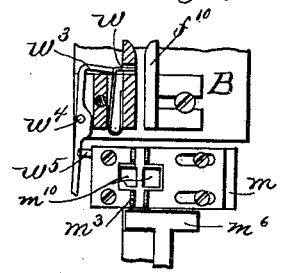
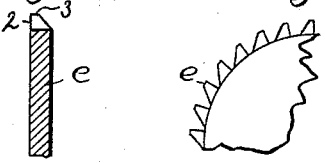
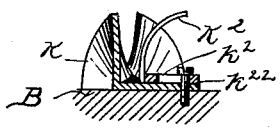
Witnesses
Jas. J. Maloney
A. J. Locke
Inventor.
Thomas M. Kenney
by Jno. P. Livermore
Atty.

UNITED STATES PATENT OFFICE.

THOMAS M. KENNEY, OF CAMBRIDGE, MASSACHUSETTS, ASSIGNOR TO CHARLES S. CONNER AND BENJAMIN F. CONNER, OF NEW YORK, N. Y.

TYPE-FINISHING MACHINE.

SPECIFICATION forming part of Letters Patent No. 484,915, dated October 25, 1892.

Application filed August 20, 1891. Serial No. 403,154. (No model.)

*To all whom it may concern:*

Be it known that I, THOMAS M. KENNEY, of Cambridge, county of Middlesex, State of Massachusetts, have invented an Improvement in Type-Finishing Machines, of which the following description, in connection with the accompanying drawings, is a specification, like letters and figures on the drawings representing like parts.
My invention relates to a machine for finishing type after casting by removing the projecting fins and sprue-marks that are left on the type by the mold. This work has usually been done by hand by rubbing the four sides of the body of the type on a grinding-surface, so as to remove all parts that project beyond the four sides of the body of the type, although attempts have been made to perform this work by machinery, usually by forcing the type against one or more stationary cutters, which trim off the projecting parts on one or more sides, or by the employment of reciprocating or rotating files or abrading-surfaces that operate upon a pair of opposite faces of a number of type simultaneously. Such machines have not, however, proved satisfactory in practice and have not been generally adopted.

The present invention is embodied in a machine having pairs of rotary cutters between which the type are passed successively in longitudinal direction, the space between each pair of cutters being equal to the thickness of the body of the type in one direction, so that the type passing between said cutters has all the projecting portions on two faces removed. There are two pairs of said rotating cutters, one to trim one pair of opposite faces of the body of the type and the other to trim the other pair of faces, and it is necessary either that the two parts of cutters should turn about axes at right angles one to the other, or that the type should be turned quarter around its longitudinal axis in passing from one pair of cutters to the other, so that each pair may act upon the proper faces of the type. As shown in this instance, the type are fed to the cutters partly by gravity and partly by feed-wheels, and both pairs of cutters and feed-wheels turn about a horizontal axis, the type receiving an axial quarter-turn in passing from one pair of cutters to the next. Means are provided for adjusting the distance between the cutters, so that they may act upon type of different size, and as the thickness of the type-shank in one direction—that is, in line with the height of the letter of the type—is the same for an entire font of type one pair of cutters will need to be adjusted only for each new font, while the other pair will have to be adjusted for type of different thickness in the same font used for the different letters and characters. The rotating cutters are provided with cutting teeth or edges at their peripheries, which act to shear off the parts that project from the type-body, thus having a cleaner and more uniform action than cutters in the nature of files, which have an abrading action upon the entire exposed surface of the type at once. A carrier is provided which takes the type one at a time as they come from the cutters and places them in upright position side by side in a guide-way, through which the column is pressed by the successively-entering type and caused to pass over a saw or cutter which removes the sprue-marks from the bottom of the type.

In working the machine the type are fed one at a time into an inclined guideway, down which they pass by gravity to the first pair of feed-wheels, which present them to the first pair of cutters, through which they are carried both by gravity and by the action of the following type presented by the feed-wheels, and after leaving the first pair of cutters they pass over an inclined chute having a quarter-turn, which causes the type passing over it to be turned quarter around axially, in which position they are taken by the second pair of feed-wheels and presented to the second pair of cutters, after passing which they are taken by the carrier and placed in column in the guideway, through which they pass over the sprue-cutter and are delivered from the machine.

All the type corresponding to one character or having one thickness of body are first finished, after which the upper pair of cutters are set for type or characters of another thickness, which are then passed through, and so on.

Figure 2:
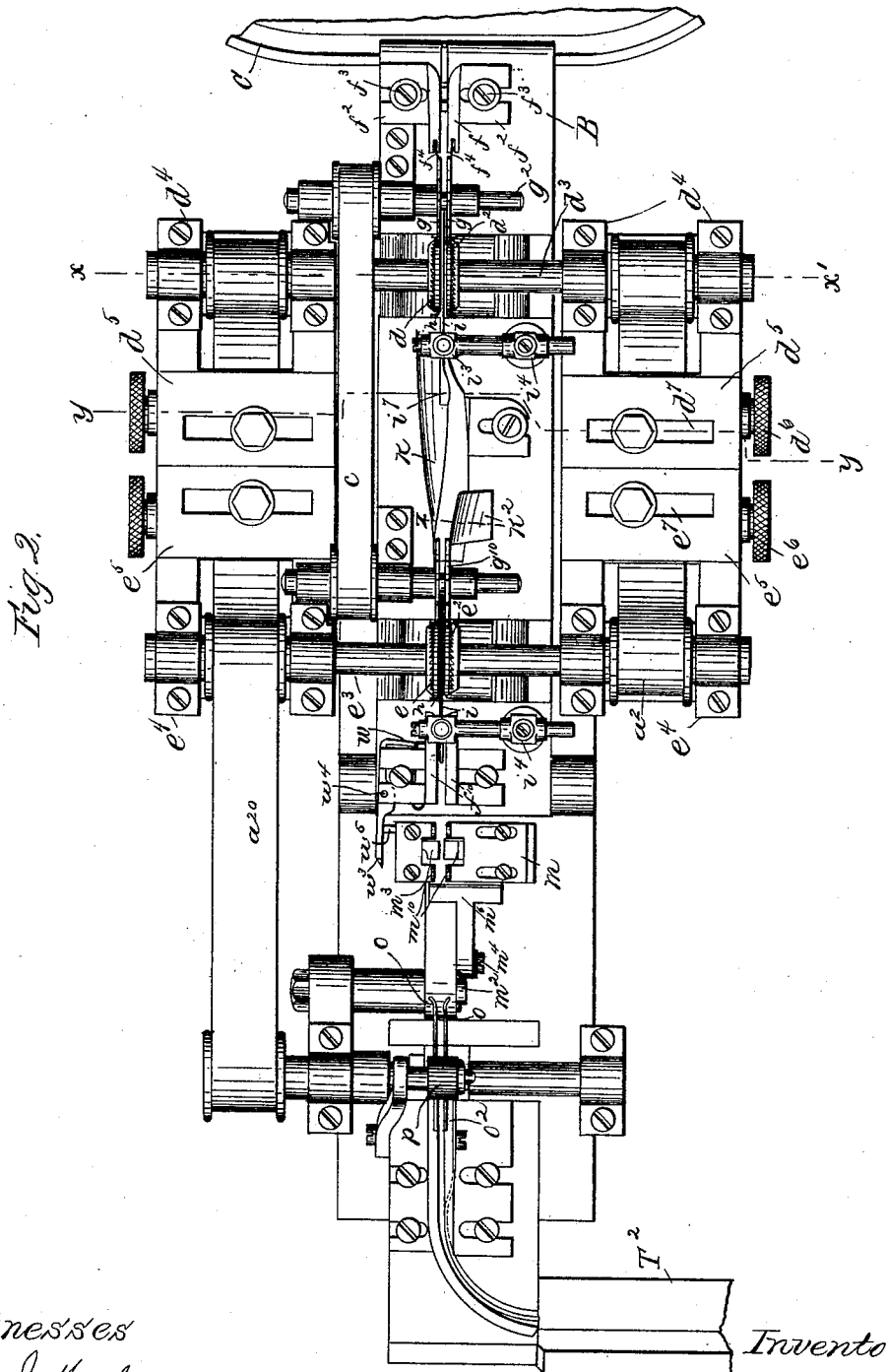
Figure 3:
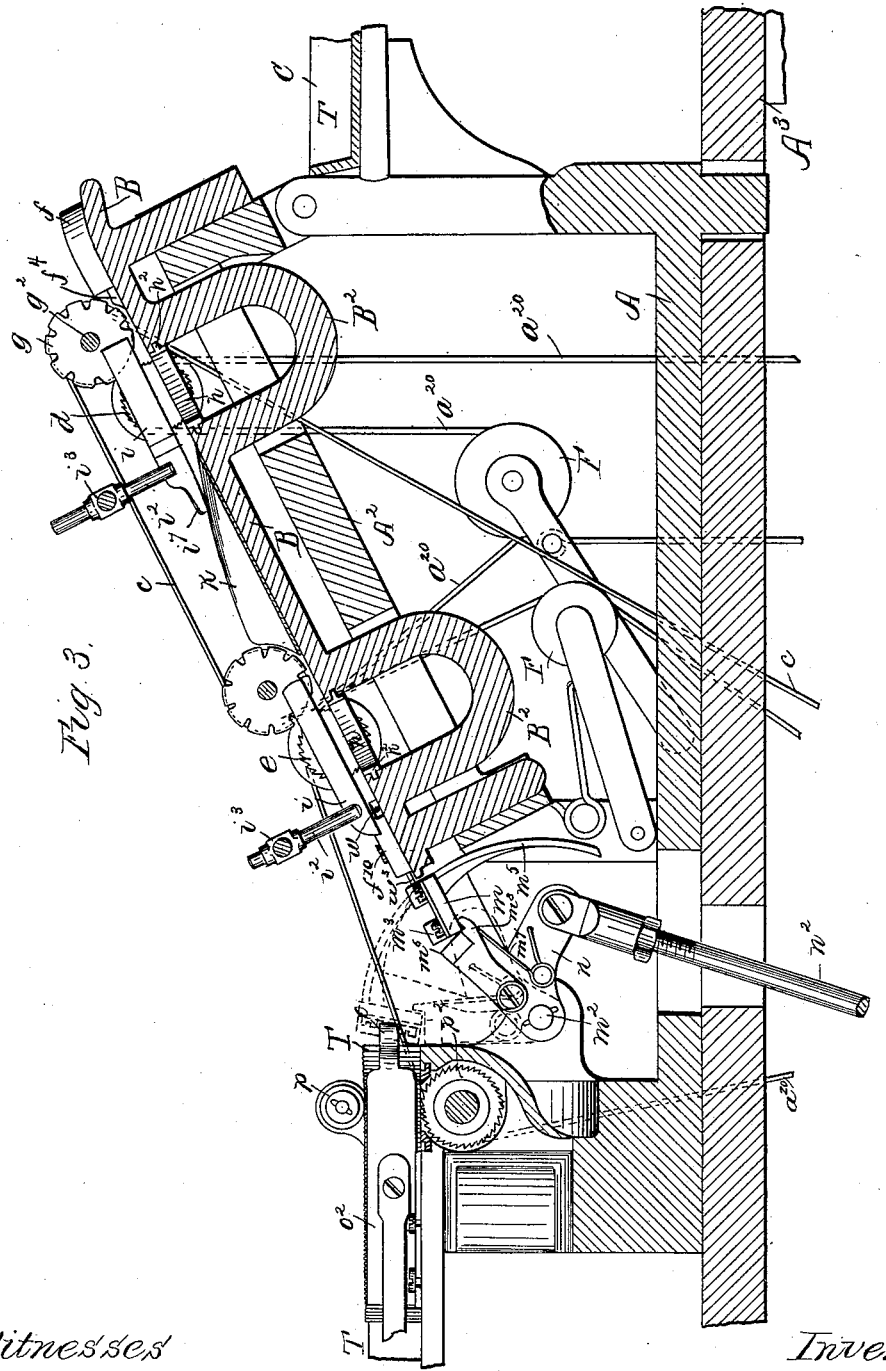
Figure 4:
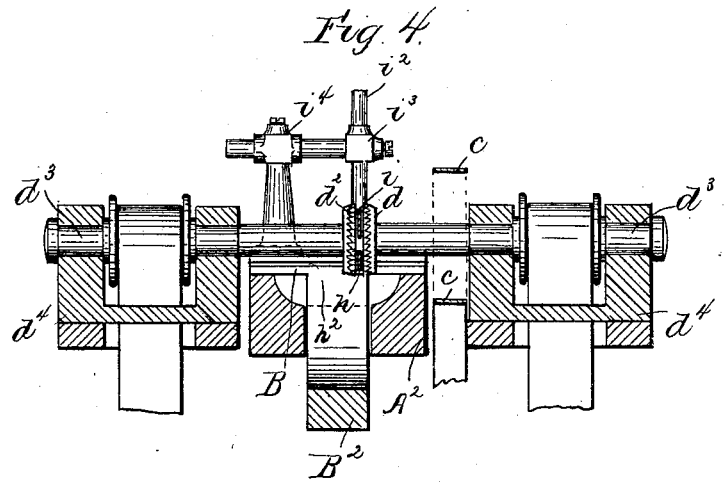
Figure 5:
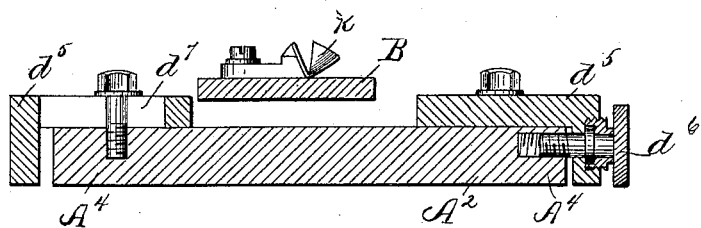

Figure 1 is a side elevation of a type-finishing machine embodying this invention; Fig. 2, a plan view thereof; Fig. 3, a central longitudinal vertical section showing the carrier and receiving-guide in side elevation; Fig. 4, a transverse vertical section on line $x\,x$, Fig. 2; and Fig. 5, a transverse vertical section on broken line $y\,y$, Fig. 2; Fig. 6, a detail showing the carrier detached in side elevation in the positions occupied in the operation of introducing a type into the receiving-stick; Fig. 7, a detail showing the carrier in side elevation, as seen from the rear of the arrows in Fig. 1, being the opposite side to that shown in Fig. 6; Fig. 8, a detail showing, in elevation, the lower end of the bed from which the type are delivered to the carrier; Fig. 9, a sectional detail showing in plan view the stop $w$, Fig. 2, and co-operating parts; Fig. 10, a detail showing a portion of the inner face of the cutting-disk that comes adjacent to the type; Fig. 11, an elevation showing a portion of the edge or periphery of the cutting-disk; Fig. 12, a sectional detail of the cutting-disk; Fig. 13, a detail showing a portion of the outer face of the cutting-disk; and Fig. 14, a sectional detail on line $z$, Fig. 2.

Fig. 1 is on a smaller scale than the remaining figures and shows the driving-shaft, which is omitted in the other figures.

The working parts of the machine are supported on a suitable frame or bed-plate A, which may be mounted on a suitable table $A^3$, (see Fig. 1,) on which is supported the actuating counter-shaft $a$, provided with pulleys from which is driven a belt $a^2$, that drives the pair of cutters on one side of the machine, and a belt $a^{20}$, that drives the pair of cutters at the other side of the machine and also the cutter that operates to form the groove at the bottom of the type, and the belt $b^2$, that drives the pulley $b$, that actuates the carrier and has connected with it a small pulley co-operating with a belt $c$, that drives the type-feed wheels, as will be hereinafter described. The said frame-piece A supports an inclined bed-plate $A^2$, on which is mounted the type-support and guideway B, the inclination of which, as shown in Fig. 3, is sufficient to cause the type to slide from its higher to its lower end by the action of gravity. The said type-support B is mainly in the form of a flat table or platform, which is, however, recessed at the places where the finishing-cutters $d\,d^2$ and $e\,e^2$ operate, as best shown in Fig. 3, the parts of said table or platform B above and below each pair of cutters being connected by a U-shaped portion or bridge $B^2$. The said cutters (see Figs. 10 to 13) are shown in this instance as each made in the form of a disk the face of which, adjacent to the type being acted upon, is plane, while the outer face is beveled near the periphery, which is notched so as to form the cutting-edges 2 in the face of the disk and cutting-edges 3 at the end of the teeth, said cutting-edges 2 and 3 thus acting only to cut off or remove portions that project from the type-body rather than acting by attrition on the entire face of the type-body, as is the case when files or similar instruments are used for finishing the type.

The type to be finished are contained in a suitable tray or reservoir C near the higher end of the supporting-guide B, as shown, and the type, which are represented by the letter T, and some of which are shown in the different positions assumed in the operation of the machine, are placed one at a time by the operator in the upper end of the type-guideway, care being taken that the type is placed in proper position in said guideway, in this instance with the sprue end forward and the nicked side uppermost, so that the width of the body is presented to the first or upper pair of cutters $d\,d^2$.

The type-guideway comprises the inclined bed B, which constitutes the floor of said guideway, and other guides mounted on said bed engage the sides of the body of the type, said guides, as well as the cutters, being adjustable to co-operate with type of different widths or thicknesses of body. The first pair of said lateral guideways are represented at $f$, said guideways having flaring ends where the type are received, as shown in Fig. 2, and slotted shank portions $f^2$, connected with the bed-pieces B by screws $f^3$, thus enabling them to be set proper distance apart for the width of the type characters at any time being finished. The said guide-pieces $f$ should be set so as to allow the type to pass freely between them, it being merely necessary to prevent possibility of the type rolling over or turning axially while passing between said guides, and the inclination of the guideway is such, as before stated, that the type will slide downward therein. The lower ends of the guide-pieces $f$ are provided with slightly-yielding fingers $f^4$, which center the type and present the same to the first pair of feed-wheels $g$, which are a pair of slightly-yielding disks or flanges mounted upon a shaft $g^2$, and one being adjustable toward and from the other on said shaft to accommodate type of different thickness. The said feed-wheels are sufficiently yielding to enable them to be set close enough to press slightly against the opposite faces of the type and are notched or nicked around their periphery, as best shown in Fig. 3, so as to make their edge portions more yielding, and also to provide recesses which receive the projection that is usually formed in casting at the shoulder of the type or point where the face portions join the body portion. Such projection will naturally drop into the first notches of the wheels that meet it as it travels down the guideway, after which the said wheels will have a positive action to feed the type to the cutters $d\,d^2$, the cutting-teeth of which are so formed as to have cutting action both on their periphery and on their inner faces, so that they immediately cut off all parts that project beyond the faces of the type-body as it passes between said cutters.

As before stated, the supporting-bed B is recessed at the points where the cutters act on the type, and it is consequently necessary to provide another floor or support for the type while passing between the cutters, which themselves constitute the side guides for the type during this part of their movement. Such support for the type is provided by means of a bridge-piece $h$, which is provided with tenons or projections working in grooves, as shown at $h^2$, in the ends of the portions of the platform B, thus providing for the removal of a given bridge-piece and substitution of a wider or narrower one, as may be required when type of different size are to be finished. The said bridge-piece need not be wide enough to completely fill the space between the cutters, and consequently a single bridge-piece may be used for type varying considerably in thickness, so that a comparatively-small number of bridge-pieces is required to accommodate type of all sizes to be finished in the machine.

The devices for supporting and actuating the type as they pass the lower part of cutters $e\ e^2$ are the same as those at the upper pair of cutters $d\ d^2$, and consequently are marked by the same reference-letters and do not need to be separately described.

As the rotation of the feed-wheels and cutters may tend to raise the type or portions thereof from the supporting-bed or bridge-piece $h$, a top guide or hold-down $i$ is also provided, the same consisting of a thin plate supported on a shank or stem $i^2$, vertically adjustable in an arm $i^3$, horizontally adjustable in a standard $i^4$ (see Figs. 1 and 2) on the bed-piece B. If the type do not readily clear from the cutters, they will be pushed out by the following type fed by the rolls $g$, and from the position between the upper cutters $d\ d^2$ will slide down upon the turning-guide $k$, which is substantially a V-shaped trough of sheet metal, having one side substantially in the plane of the bed B and the other side at right angles thereto at the end adjacent to the cutters $d\ d^2$, the said trough being twisted axially, so that at its lower end adjacent to the cutters $e\ e^2$ the side which at the upper end was parallel with the bed B is at right angles thereto, while the side at right angles to the bed at the upper end is parallel with the bed at the lower end, so that the type resting in the angle of the trough and sliding down the same from the upper to the lower end is turned axially about quarter around and presents the intermediate faces at right angles to the bed B to those which were at right angles to the bed when the type was first applied thereto. At the lower end of the turning-guide $k$ the type is received by a second pair of feed-wheels $g^{10}$, precisely similar to the feed-wheels $g$ that carry the type into the upper pair of cutters, said lower feed-wheels $g^{10}$ acting in the same manner to carry the type to the action of the lower pair of cutters $e\ e^2$, which thus trim the faces of the type which were not trimmed by the upper pair of cutters.

An additional adjustable guide-piece $k^2$, (see Fig. 2,) near the lower end of a turning-guide $k$, co-operates with the side of the said turning-guide, which is at right angles to the bed-plate, so as to deliver the type directly in line with the feed-wheels $g^{10}$ in proper position to be received thereby. The guide-piece $k^2$ has a slotted supporting-shank $k^{20}$, which receives a fastening screw $k^{22}$, (see Fig. 14,) by which it is held in proper position relative to the turning-guide, the slot permitting it to be adjusted to co-operate with type of different widths. After passing the lower pair of cutters $e\ e^2$ the type continues down the chute by gravity, and at the proper time is received upon the carrier $m$, which consists of a platform pivoted at $m^2$ so as to turn from the full to the dotted line position, Fig. 3, said platform when in full-line position being in line with the bed $b$, so that the type passes from said bed directly onto said platform and is received between adjustable side supports $m^3$ thereon. Then said platform $m$ has connected with it an arm $n$, operated by a link $n^2$, (see Figs. 1 and 3,) actuated by a wrist-pin $n^3$, rotated by the pulley $b$, said wrist-pin working in a slot $n^4$ in the link $n^2$, so as to afford lost motion, thus making the movement of the carrier $m$ intermittent, the said carrier remaining stationary in the full-line position, Fig. 3, while the wrist-pin $n^3$ is moving through about one-half of its path, at which time it travels up and down the slot $n^4$ without moving the link $n^2$ longitudinally. In the upper half of its circle of movement the wrist-pin $n^3$ engages the link and throws the carrier $m$ from the full to the dotted line position, Fig. 3, and immediately thereafter permits it to return to the full-line position again, the link $n^2$ being drawn downward by a spring $n^5$, as shown in Fig. 1.

The carrier is provided with a curved apron $m^5$, which stands across the lower end of the chute or guideway on the bed B when the carrier is moved from the full to the dotted line position, and thus arrests any type that may follow the one being conveyed by said carrier until said carrier returns to its full-line position, when said type will drop by gravity onto the carrier, which is of proper length to receive one type only at a time. When the carrier is moved to the dotted-line position, Fig. 3, the type which is then upon it is forced between a pair of yielding fingers $o$, which project from the ends of guide-strips $o^2$, properly arranged to receive the column of type T between them, as shown in Fig. 3, said fingers $o$ entering a space between the type-holding projections $m^3$ on the carrier and bearing with sufficient friction to hold the type after the carrier has completed its movement, so that the carrier returns, leaving the type between the fingers $o$, as shown in Fig. 3, the column being advanced as each new type is introduced by the positive pressure of the carrier actuated as has been described. The carrying-arm for the platform $m$ is in the shape of an elbow-lever, as best shown in Fig. 7, and has pivoted upon it at $m^4$ a stop $m^6$, which in the position shown in Figs. 1, 3, and 7 operates to arrest the type as they pass off from the main bed of the machine and onto the platform. The said stop is held in position to arrest the type by a spring $m^7$, its movement under the action of the spring being limited by a finger $m^8$, which engages under the platform. The stop $m^8$ supports the end of the type until the carrier arrives at the position shown in dotted lines, Fig. 3, and in full lines, Fig. 5, when the said stop comes in engagement with the framework below the receiving-fingers $o$, and in the further forward movement of the carrier to the dotted-line position, Fig. 6, by which the type is forced effectively into the grasp of the fingers $o$, the said stop $m^6$ is arrested and turns back on its pivot $m^4$ with relation to the carrier-arm, the spring $m^7$ yielding to permit this movement and the carrier-arm being recessed, as shown at $m^9$, to receive the projecting end of the stop which extends over it, as shown in Fig. 9. In the last part of the movement of the carrier the fingers $o$ enter recesses $m^{10}$ (see Fig. 9) in the carrier, provided to accommodate them. A stop $w$ is provided to act on the type after they pass the lower cutters and before they are received upon the carrier $m$. The said stop is best shown in Figs. 8 and 9, and consists of a spring-finger connected with one of the pair of guides $f^{10}$, between which the type are received from the lower pair of cutters $e$, said spring having its end work through an opening in the side of the said guide, as shown in Figs. 9 and 3. The spring is operated by a lever $w^3$, pivoted at $w^4$ under the shank of the guide-piece $f^{10}$ and acted upon by a cam or projection $w^5$ (see Figs. 8 and 9) at the side of the carrier $m$, these parts being so arranged that when the carrier comes to the full-line position, Fig. 3, so as to receive a type upon it, the cam $w^5$ causes the stop $w$ to be pressed inward, so that if there are more than one type in the space below the cutters $e$ the second type from the carrier will be engaged by the stop-finger and pressed against the opposite guide-piece sufficiently to hold it while the lowermost type slides off from the bed-plate B and onto the platform $m$. After the carrier begins its movement from the full to the dotted line position, Fig. 3, the cam $w$ is removed from the end of the lever $w^3$, permitting the stop-finger to spring outward and release the type engaged by it, which will then slide down until arrested by the guard or apron $m^5$ in position to pass onto the carrier as soon as the latter comes back to its full-line position.

The column of type, passing from the guideway $o^2$, moves beneath a pressing-roll $p$, which may be covered with rubber or other yielding material, so as not to injure the face of the type which pass beneath it, but which holds said type down to the action of the cutter $p^2$, which cuts the usual groove in the lower end of the type, which sprue after passing said sprue-cutter are complete and may be delivered upon the receiving-stick $T^2$. (See Fig. 2.)

It is necessary to adjust the various parts that co-operate with the type in order that they may act properly with type of different size. It is, however, only necessary to adjust the cutters, feed-wheels, and side guides at one side of the path of the type. For convenience, however, both cutters of each pair are shown as supported in adjustable bearings. The cutter-shafts $d^3$ and $e^3$ are supported in bearings $d^4$ and $e^4$, properly constructed to prevent endwise movement or looseness of the shaft in the bearings, which latter are mounted upon brackets or carriages $d^5 e^5$, adjustable on laterally-projecting portions $A^4$ from the inclined bed $A^2$. Screws $d^6 e^6$ are provided for moving the bearing-brackets on said supporting-arms, said brackets being slotted, as shown at $d^7 e^7$ (see Fig. 2) to receive fastening-bolts, by which they are rigidly clamped when brought to the proper adjustment.

The cutters at one side of the raceway are driven by a separate belt from those at the other side, as best shown in Fig. 2, the several driving-belts being maintained in proper state of tension by idlers F, (see Fig. 1,) and the sprue-cutter $p^2$ being driven by the same belt that drives the cutters $d e$, as shown in Fig. 2. The said cutters are driven at a higher rate of speed than the feed-wheels, so as to have the proper action upon the type.

The hold-down $i$, that co-operates with the upper pair of feed-wheels and upper pair of cutters, is extended and turned at its lower end, as shown at $i^7$, Figs. 2 and 3, to co-operate with the turning-guide $k$ and assist in turning the type properly.

The invention is not limited to the specific details of construction and arrangement hereinbefore described, as it is obvious that they may be varied widely without materially changing the essential features of construction and operation of the machine.

I claim—

1. In a type-finishing machine, the combination of a guideway constructed to receive the type longitudinally with a pair of parallel-faced rotary cutters having cutting-edges at their periphery, said cutters being fixed at a distance apart equal to the thickness of the body of the type between one pair of its opposite faces, and supports engaging the intermediate faces of the type while passing between said cutters, substantially as and for the purpose described.

2. The combination, with the pairs of rotary cutters adapted to receive the type between them, of the feed-wheels adjacent to said cutters operating to feed the type one at a time longitudinally to the cutters, substantially as described.

3. The combination of the two pairs of cutters with a type-guideway having guide-surfaces arranged to guide the type longitudinally between them and a type-turning portion between said pairs of cutters, whereby the type is turned axially in passing longitudinally from one pair of cutters to the next for the purpose of presenting different faces to the two pairs of cutters, substantially as described.

4. The combination of the type-guideway and cutters for acting upon the type as they move longitudinally on said guideway with an oscillating carrier having a platform provided with adjustable side supports, between which said type are received one at a time endwise from the guideway after passing the cutters, and a receiver to retain the type in column as they come from the carrier, substantially as described.

5. The combination of the type-guideway and cutters for acting upon the type as they move longitudinally on said guideway with an oscillating carrier by which said type are taken one at a time from the guideway after passing the cutters, a receiver to retain the type in column as they come from the carrier, a yielding-faced rotating presser acting on the face of the column of type, and a cutter at the opposite end of the type from the said presser, substantially as described.

6. The type-supporting bed provided with a recess and a pair of rotating cutters the plane of rotation of which is at right angles to the plane of said bed, said cutters operating in said recess, combined with a bridge-piece extending across said recess between the cutters, substantially as described.

7. The combination of the type-supporting bed provided with a recess and cutters operating therein, which act upon the type as they pass between said cutters, with the bridge for supporting the type as they pass between the cutters and the hold-down piece $i$, co-operating with the type as they pass between the said cutters, substantially as described.

8. The combination of the type-finishing cutters and type-supporting guideway with the feed-wheels having yielding notched peripheries between which the type-bodies are received, substantially as described.

9. The combination of the type-supporting guideway constructed to receive the type longitudinally with a pivoted oscillating type-carrier comprising a platform to receive the type endwise from said guideway, and a curved apron or guard extending from the end of said platform concentric with the axis of oscillation of the carrier, and a type-receiver into which the type are delivered by the carrier after being received thereon from the guideway, substantially as described.

10. The combination of a type-supporting guideway with the pivoted oscillating carrier and actuating mechanism therefor and the type-receiver, the said carrier being located to oscillate from a position in which it receives the type from the guideway to the position in which it delivers the said type to the receiver, and a stop $w$, adapted to engage with the type in the guideway, substantially as and for the purpose described.

11. The combination of the type-supporting guideway, the pivoted oscillating carrier $m$, the stop pivoted thereon, and the receiver provided with spring-fingers $o$, substantially as described.

In testimony whereof I have signed my name to this specification in the presence of two subscribing witnesses.

THOMAS M. KENNEY.

Witnesses:
L. C. NYE,
E. G. ELDRIDGE.